No. 770,319. Patented September 20, 1904.

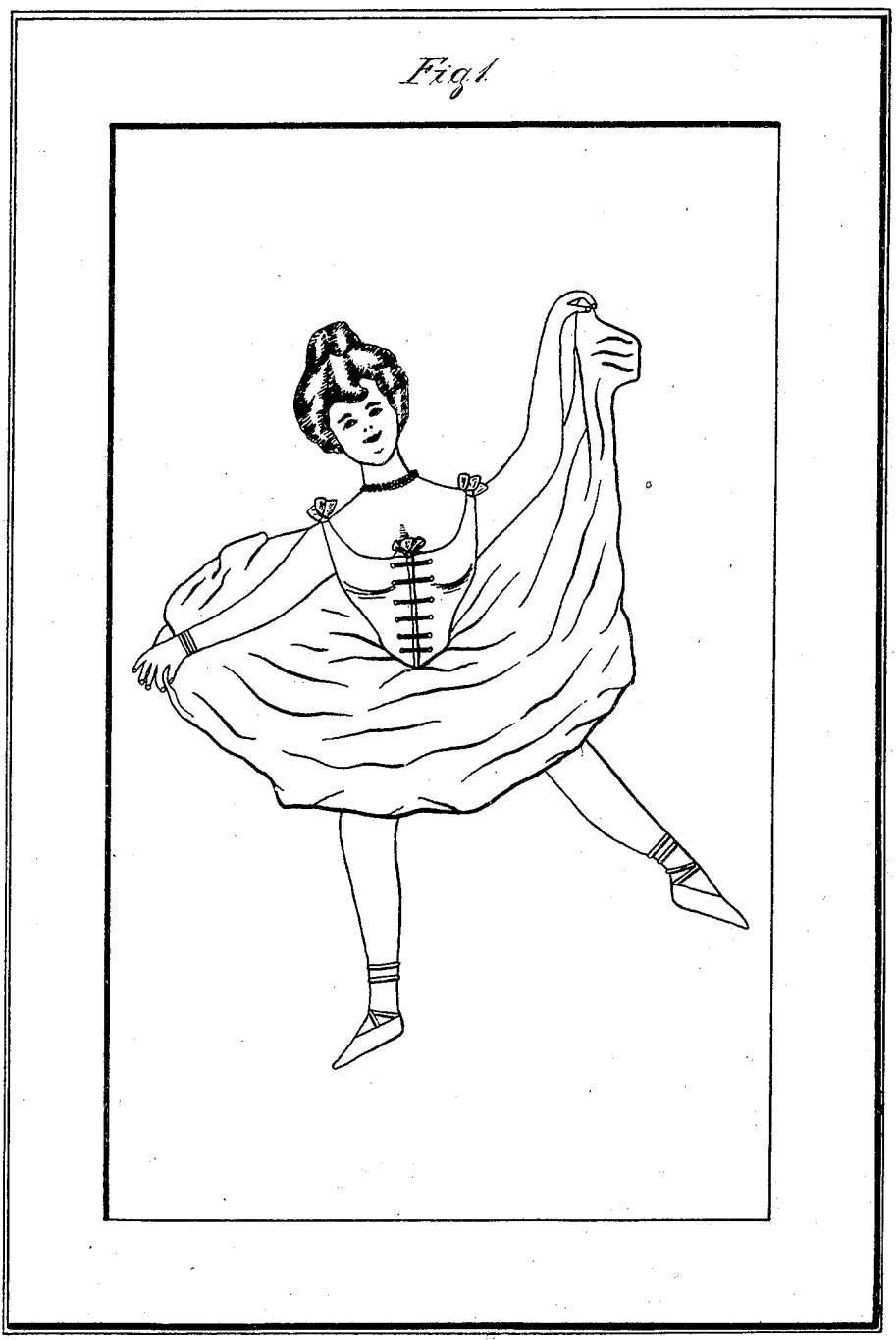

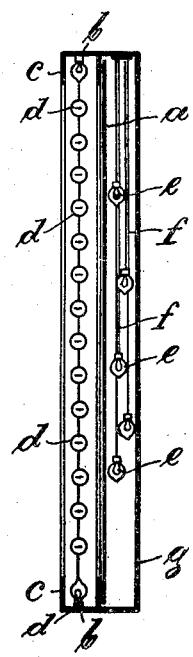

UNITED STATES PATENT OFFICE.

JOSEF BOLESLAUS VON RÜDIGER, OF BERLIN, GERMANY, ASSIGNOR TO THE FIRM OF T. HURWITZ, OF BERLIN, GERMANY.

ADVERTISING APPARATUS.

SPECIFICATION forming part of Letters Patent No. 770,319, dated September 20, 1904.

Application filed July 29, 1903. Serial No. 167,454. (No model.)

*To all whom it may concern:*

Be it known that I, JOSEF BOLESLAUS VON RÜDIGER, a subject of the German Emperor, and a resident of 5 Holsteiner Ufer, Berlin, in the Kingdom of Prussia, German Empire, have invented certain new and useful Improvements in Advertising Apparatus, of which the following is an exact specification.

My invention relates to improvements in advertising apparatus, and has for its purpose to provide a picture or the like to be illuminated alternately from the front and from the back, the picture looking different when illuminated from the front side and when illuminated from the back side.

In order to make my invention more clear, I refer to the accompanying drawings, which show an example of an apparatus forming the object of the present invention.

Figure 1 shows the front side of the apparatus. Fig. 2 shows the interior side of the front wall shown in Fig. 1. Fig. 3 shows the front wall shown in Fig. 1, with the interior side of this front wall indicated in dotted lines. Fig. 4 is a cross-section of the whole apparatus.

The front wall $a$ of the apparatus consists of a transparent material fixed in a frame $b$. This frame is constructed so as to leave a small space between the front side $c$ of the frame and the front wall $a$ of the apparatus, in which space electric glow-lamps $d$ are arranged. Behind the transparent material $a$ glow-lamps $e$ are arranged, which are advantageously suspended by means of wires $f$.

$g$ is the back wall of the apparatus; but it will be understood that in case the apparatus is fixed to a wall or the like this back wall $g$ is not necessary at all.

Upon the transparent material $a$ a picture, as shown, for instance, in Fig. 1, is painted. Upon the back side of the material $a$ the same figure represented by the picture shown in Fig. 1 is painted in another position, as may be seen from Fig. 2. Those parts of the back side of the material $a$ which are not covered by the picture are covered with a layer of an untransparent material—as, for instance, paper, untransparent paint, as white paint, or the like.

The effect of the apparatus is as follows: If the lamps $d$ are lighted, only the picture shown in Fig. 1 is visible, whereas in case the lamps $d$ are extinguished and the lamps $e$ are lighted only the transparent picture can be seen from the outside. If, therefore, the lamps $e$ are lighted, the picture which looked at first as shown in full lines in Fig. 3 looks suddenly as shown in dotted lines in this figure, and the figure represented by the picture therefore seems to move.

It will be understood that in case the picture on the front side and on the back side of the material $a$ is partly the same it is not necessary to paint the whole picture twice; but it is only necessary to paint those parts which are different in position. It will also be understood that any kind of light may be used and that any kind of switches or other apparatus may be arranged for automatically effecting the lighting.

Having thus fully described the nature of this invention, what I desire to secure by Letters Patent of the United States is—

In advertising apparatus, the combination of a box, the front side of which consists of a transparent material, a picture being painted upon the front side of this material and the same picture in another position upon the back side of this material, those parts of the back side not being covered by the picture being covered by a non-transparent material, with means for lighting the front side of the box, and means for lighting the inside of the same, substantially as described and for the purpose set forth.

In testimony whereof I have signed my name to this specification in the presence of two subscribing witnesses.

JOSEF BOLESLAUS VON RÜDIGER.

Witnesses:
 HENRY HASPER,
 WOLDEMAR HAUPT.